E. M. JOHNSON.
AUTOMATIC GAS FIXTURE.
APPLICATION FILED FEB. 8, 1909.
956,531.
Patented May 3, 1910.
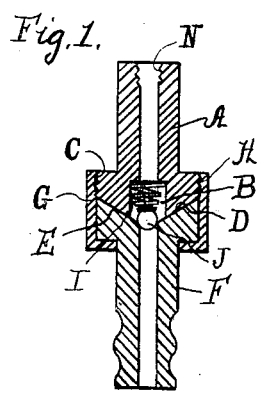
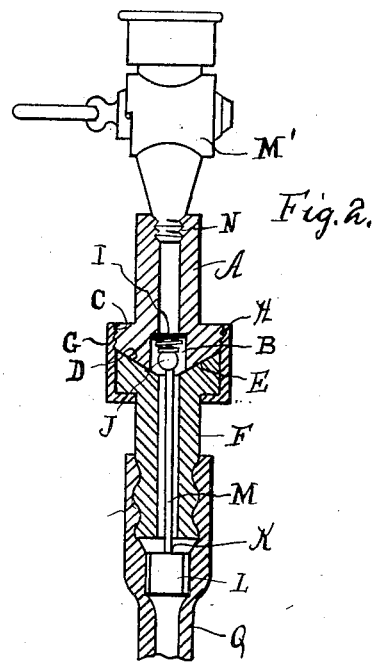
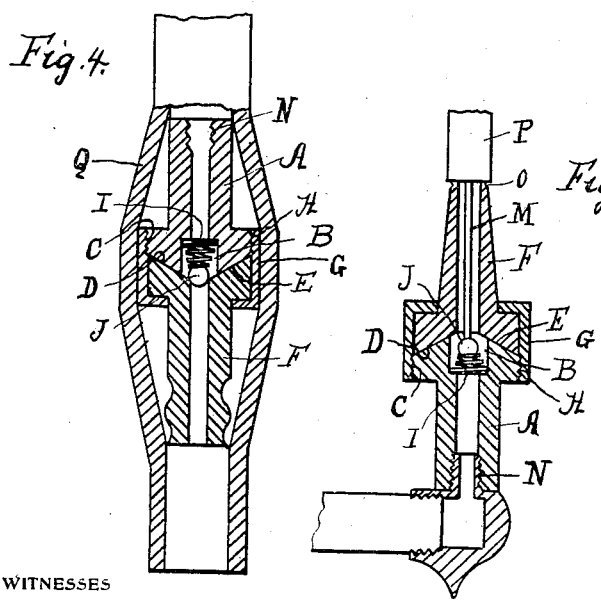
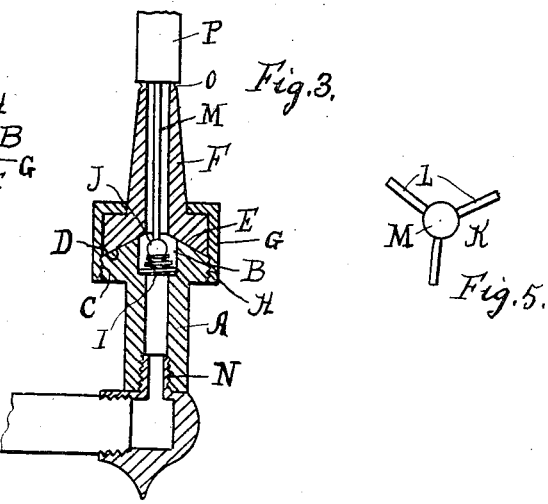
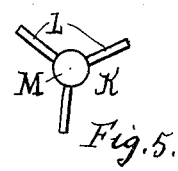
WITNESSES
INVENTOR
Edwin M. Johnson
BY
ATTORNEY

UNITED STATES PATENT OFFICE.

EDWIN M. JOHNSON, OF PHILADELPHIA, PENNSYLVANIA.

AUTOMATIC GAS-FIXTURE.

956,531. Specification of Letters Patent. Patented May 3, 1910.

Application filed February 8, 1909. Serial No. 476,694.

*To all whom it may concern:*

Be it known that I, EDWIN M. JOHNSON, a citizen of the United States, residing at Philadelphia, in the county of Philadelphia and State of Pennsylvania, have invented a certain new and useful Improvement in Automatic Gas-Fixtures, of which the following is a specification.

My invention relates to a new and useful improvement in automatic gas fixtures, and has for its object to provide an exceedingly simple and effective device of this character whereby the gas may be automatically turned off should any of the loose connections become broken or disconnected.

Often the loose connections to a gas stove or lamp from a gas jet or independent cock are disconnected by accident or carelessness, which not being noticed by a person causes loss of life by asphyxiation, but by the use of my improvement this will be entirely overcome, for as soon as the parts have disconnected the gas will be automatically shut off.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by letter to the accompanying drawing forming a part of this specification, in which—

Figure 1 is a longitudinal sectional view of my improved automatic gas fixture the hose and valve unseating member being removed. Fig. 2, a similar view showing it applied to an independent gas cock and hose connection. Fig. 3, a similar view showing it applied to a gas jet. Fig. 4, a similar view as it is placed in the end of a gas hose the valve unseating member not being shown. Fig. 5, an end view of the valve operating member.

In carrying out my invention as here embodied, A represents a connecting member provided with a valve retaining chamber B and having threads C formed on the outer surface thereof, and this member A is adapted to be threaded on to a gas jet, an independent gas cock or other similar object. The end of the member A is beveled, as indicated at D, so that it will readily sit against the beveled portion E of the valve seat and hose connecting member F, around which is placed the connector G, having threads H formed on the inner surface thereof adapted to engage with the threads C formed on the member A.

Within the valve retaining chamber B is placed the spiral spring I, one end of which rests against the upper wall of the valve retaining chamber B, and the other against the ball valve J for normally pressing said ball valve against its seat, thereby shutting off the flow of gas.

Within the hose gas burner, stove or lamp with which a connection is made is placed the valve operating member K, which has a corrugated body L and a stem M, said stem adapted to pass through the opening in the member F and raise the ball valve J away from its seat, which will permit the gas to flow through the gas fixture.

Of course it is understood that the different parts will have to be so constructed as to conform to the different uses to which it is to be put, such as when the device is to be used on an independent gas cock.

Threads N are formed in the member A, which engage with threads on said independent gas cock M', and when the device is to be used on a gas jet, threads O will be formed on the outer surface of the member F, so that the burner P may be threaded thereon, but when the device is to be placed in a hose it need not have threads on the two farthest removed ends of the members A and F, nor need said members be of such length as shown.

On the ends of gas hose there is a rubber portion Q, in which the gas fixture may be placed, as shown in Fig. 4.

In practice the fixture is secured to an independent gas cock, a gas jet or placed in a gas hose. When the device is placed on an independent gas cock the valve operating member K is placed in the hose, and when the hose is connected to the device the stem M of the operating member K will pass upward through the member F, lifting the ball valve J from its seat, which will allow the gas to flow, and should the hose be pulled from the device, the spring I will at once cause the valve J to rest against its seat, shutting off the flow of gas. When the device is used on a gas jet the operating member K is placed in the burner P, and as this burner is threaded on the member F, the operating member will remove the valve J from its seat. Should the burner P be threaded on the member F only a short distance the valve J will be moved from its seat only a short distance, thus regulating the flow of gas through the burner no matter how far open the key of the gas jet may be turned. When the fixture is used in the gas hose the operating member K is placed in the connection of the gas stove, lamp or other similar article so that when the hose is disconnected the flow of gas will be shut off therein.

Of course I do not wish to be limited to the exact details of construction here shown, as these may be varied within the limits of the appended claims without departing from the spirit of my invention.

Having thus fully described my invention, what I claim as new and useful, is—

1. In a device of the character described, a connecting member provided with a valve retaining chamber, threads formed on the inner surface of its outer end, other threads formed on the outer surface of its inner end, said inner end being beveled, a hose connecting and valve seating member having its inner end beveled to coincide with the beveled end of the adjacent member, threads formed on the outer surface of its outer end, a connector having threads on its inner surface adapted to connect said members together, a ball valve resting within the valve retaining chamber, a spiral spring also resting within said chamber for normally holding the ball valve against its seat, and a valve operating member having a corrugated body and a stem adapted to open the valve when the connection retaining the same is joined to the gas fixture.

2. In a device of the character described, a connecting member provided with a valve retaining chamber, the inner end of said valve chamber being beveled, a hose connecting and valve seating member having its inner end beveled to coincide with the beveled end of the valve chamber, a connector for detachably securing said members together in such a way that their beveled faces rest against one another, a ball valve resting within the valve retaining chamber, a spiral spring mounted in said chamber for normally holding said ball valve in contact with its seat, a gas hose adapted to be mounted on the outer end of the hose connecting member, a valve operating member having a corrugated body, and a stem carried by said gas hose so that when said hose is placed on the hose connecting member, the stem of the operating member will press the ball valve away from its seat against the action of the coil spring, as specified and for the purpose set forth.

In testimony whereof, I have hereunto affixed my signature in the presence of two subscribing witnesses.

EDWIN M. JOHNSON.

Witnesses:
JOHN F. HUGHES,
P. J. HUGHES.